United States Patent
Park

(10) Patent No.: US 9,014,894 B2
(45) Date of Patent: Apr. 21, 2015

(54) SYSTEM AND METHOD FOR DETECTING ENGINE CLUTCH DELIVERY TORQUE OF CAR

(71) Applicants: Hyundai Motor Company, Seoul (KR); Kia Motors Corporation, Seoul (KR)

(72) Inventor: Joonyoung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 13/730,126

(22) Filed: Dec. 28, 2012

(65) Prior Publication Data

US 2013/0325231 A1 Dec. 5, 2013

(30) Foreign Application Priority Data

Jun. 5, 2012 (KR) ........................ 10-2012-0060458

(51) Int. Cl.
*B60W 20/00* (2006.01)
*B60W 10/02* (2006.01)
*F16D 48/08* (2006.01)

(52) U.S. Cl.
CPC .............. *B60W 20/10* (2013.01); *B60W 10/02* (2013.01); *F16D 48/08* (2013.01); *B60W 2510/0275* (2013.01); *B60W 20/50* (2013.01); *B60Y 2300/427* (2013.01)

(58) Field of Classification Search
CPC .............................. B60W 20/40; B60W 20/00
USPC .......................................................... 701/22
See application file for complete search history.

(56) References Cited

U.S. PATENT DOCUMENTS

| | | | | |
|---|---|---|---|---|
| 4,685,548 A | * | 8/1987 | Holtermann et al. | 477/54 |
| 7,111,611 B1 | * | 9/2006 | Lyon | 123/399 |
| 7,286,922 B1 | * | 10/2007 | Fischer et al. | 701/51 |
| 7,676,313 B2 | * | 3/2010 | Ortmann et al. | 701/64 |
| 2004/0128050 A1 | * | 7/2004 | Rieger et al. | 701/67 |
| 2005/0261817 A1 | * | 11/2005 | Koenig et al. | 701/54 |
| 2007/0102207 A1 | * | 5/2007 | Yamanaka et al. | 180/65.3 |
| 2009/0118878 A1 | * | 5/2009 | Park | 701/22 |

(Continued)

FOREIGN PATENT DOCUMENTS

| | | |
|---|---|---|
| JP | 2001113971 A | 4/2001 |
| JP | 2003011699 A | 1/2003 |

(Continued)

*Primary Examiner* — Yonel Beaulieu
*Assistant Examiner* — Martin Weeks
(74) *Attorney, Agent, or Firm* — Mintz Levin Cohn Ferris Glovsky and Popeo, P.C.; Peter F. Corless

(57) ABSTRACT

Disclosed is a detecting method of engine clutch delivery torque of a vehicle including: determining, by a controller, when the position of a shift lever satisfies a detecting condition of engine clutch delivery torque; converging, by the controller, to a predetermined target speed by operating a motor without load; measuring, by the controller, motor torque without a load at the target speed and engaging the engine clutch with a control pressure above a contact point (contact point+α) according to a control logic; detecting, by the controller, motor torque including the delivery torque of the engine clutch, when the speed and the torque of the motor converge according to engagement of the engine clutch; calculating, by the controller, torque deviation by comparing the motor torque without load and the motor torque including the engine clutch delivery torque; and detecting, by the controller, a compensation factor by comparing a model value of the engine clutch delivery torque with the torque deviation.

10 Claims, 3 Drawing Sheets

(56) References Cited

U.S. PATENT DOCUMENTS

2010/0064677 A1* 3/2010 Kawaguchi et al. ............ 60/431
2010/0312443 A1* 12/2010 Long .............................. 701/67
2012/0227379 A1* 9/2012 Koestler ......................... 60/274

FOREIGN PATENT DOCUMENTS

| JP | 2007198564 A | 8/2007 |
| JP | 2010105649 A | 5/2010 |
| JP | 2012183957 A | 9/2012 |

* cited by examiner

SYSTEM AND METHOD FOR DETECTING ENGINE CLUTCH DELIVERY TORQUE OF CAR

CROSS-REFERENCE TO RELATED APPLICATION

This application claims priority to and the benefit of Korean Patent Application No. 10-2012-0060458 filed in the Korean Intellectual Property Office on Jun. 5, 2012, the entire contents of which are incorporated herein by reference.

BACKGROUND OF THE INVENTION (a) Field of the Invention

The present invention relates to an environmentally friendly vehicle. More particularly, the present invention relates to a system and method for detecting engine clutch delivery torque of an environmentally friendly vehicle which can improve drivability and fuel consumption by detecting delivery torque of an engine clutch.

(b) Description of the Related Art

Environmentally friendly vehicles improve fuel consumption and comply with recent exhaust regulations. The environmentally friendly vehicle, generally includes a fuel cell vehicle, electric vehicle, a plug-in electric vehicle, and a hybrid vehicle equipped with one or more motors and engines, a battery storing high voltage electricity for operating the motor, an inverter that converts the DC voltage of the battery into AC voltage, and an engine clutch disposed between the engine and the motor to transmit the power of the engine to a driving shaft.

The environmentally friendly vehicle may operate in an HEV (hybrid electric vehicle) driving mode or an EV driving mode (electric vehicle) by engaging/disengaging the engine clutch according to the intention of the driver operating the acceleration pedal and the brake pedal, the load, the vehicle speed, and the SOC (Status Of Charge) of the battery.

It is possible to ensure drivability of the environmentally friendly vehicle by engaging the engine clutch after the engine speed and the motor speed are synchronized to maintain a constant torque during power transmission between the engine and the motor, when changing from the EV mode to the HEV mode.

However, it is necessary to control the engine clutch to slip for starting under conditions when the battery is maintained in a low SOC, when the temperatures of the battery and the motor is above a reference temperature condition, and when the road that the vehicle travels on has a steep slope. Additionally, it is necessary to control the pressure of the clutch to control the engine clutch to slip under the driving conditions.

The delivery torque of the engine clutch, which is torque (e.g., load at both ends of the engine clutch) transmitted by physical contact between the friction surfaces of both ends of the engine clutch, can be estimated from the efficient pressure of the friction coefficient.

Controlling the engine clutch is an important factor that determines the drivability and the fuel consumption in starting the environmentally friendly vehicle, the friction coefficient changes with the deviation in current and pressure characteristics of a solenoid valve operating the engine clutch, aging of the solenoid valve, and degradation of the friction members at both ends of the engine clutch, generating characteristic deviations.

As described above, it is difficult to precisely control the engine clutch in the environmentally friendly vehicle, because characteristic deviations are generated by deterioration of the parts associated with the control of the engine clutch, thereby decreasing drivability and fuel consumption.

Characteristic deviations are generated in the estimated delivery torque, depending on the types of the vehicles, because a technology of detecting the delivery torque of the engine clutch is not applied to the environmentally friendly in the related art, so the acceleration characteristic of starting may be different according to the vehicle type and in durability (aging).

Further, in controlling the engine speed and the responsiveness for the starting is deteriorated, and incorrect factors may be fed forward to the engine controller when controlling the engine clutch in starting.

The above information disclosed in this section is only for enhancement of understanding of the background of the invention and therefore it may contain information that does not form the prior art that is already known to a person of ordinary skill in the art.

SUMMARY OF THE INVENTION

The present invention provides a detecting method and system for engine clutch delivery torque of an environmentally friendly vehicle having advantages of improving drivability, responsiveness for starting, and fuel consumption by detecting delivery torque according to characteristic deviation of parts associated with controlling an engine clutch in an environmentally friendly vehicle, regardless of deterioration of parts.

According to an embodiment of the present invention, a detecting system for engine clutch delivery torque of an environmentally friendly vehicle equipped with an engine and a motor as power sources, may include: an engine clutch that implements EV (electric vehicle) mode/HEV (hybrid electric vehicle) mode by engaging/disengaging the engine with the motor; an inverter controlled by a hybrid controller to operate the motor; a transmission sensor that detects the status of a transmission; and a hybrid controller that controls driving of the environmentally friendly vehicle, in which when the status of the transmission is a detecting condition for engine clutch delivery torque, the hybrid controller may maintain a predetermined relative speed between the motor and the engine without load by operating the motor at a target speed, may engage the engine clutch with a control pressure above a contact point (contact point pressure+α), may measure torque of the motor including the delivery torque of the engine clutch, may compare the difference from a basic model value, thereby detecting the delivery torque of the engine clutch.

The engine without load may mean a status when a predetermined level of RPM can be maintained between the motor and the engine under the condition that the engine is not in operation or in idle. The contact point when the engine clutch is engaged may mean the control pressure when the torque of the motor starts changing with both ends of the engine clutch in contact. The detecting condition of the engine clutch may mean that the shift gear of the transmission is at a P-position (park) or an N-position (neutral).

According to another embodiment of the present invention, a detecting method of engine clutch delivery torque of an environmentally friendly vehicle, may include: determining when the position of a shift lever satisfies a detecting condition of engine clutch delivery torque; converging to a predetermined target speed by operating a motor without load, when the detecting condition of engine clutch delivery torque is satisfied; measuring motor torque A without a load at the target speed and engaging the engine clutch with a control pressure above a contact point (contact point+α) according to a control logic; detecting motor torque B including the delivery torque of the engine clutch, when the speed and the torque of the motor converge according to engagement of the engine clutch; calculating torque deviation by comparing the motor torque without load with the motor torque B including the engine clutch delivery torque; and detecting a compensation factor by comparing a model value of the engine clutch delivery torque with the torque deviation.

The detecting condition of the engine clutch delivery torque may be set as an unloaded condition with a shift lever at an N-range or a P-range. An engine may be kept in non operation or in an idle mode under the detecting condition of the engine clutch delivery torque.

As described above, the present invention may provide improved fuel consumption and responsiveness for starting of the vehicle by ensuring precision in controlling the engine clutch, by detecting delivery torque of the engine clutch having characteristic deviations according to current and pressure deviations of a solenoid valve operating the engine clutch, deterioration of the solenoid valve, and deterioration of friction members at both end of the engine clutch, as durability deteriorates in an environmentally friendly vehicle.

Figure 1:
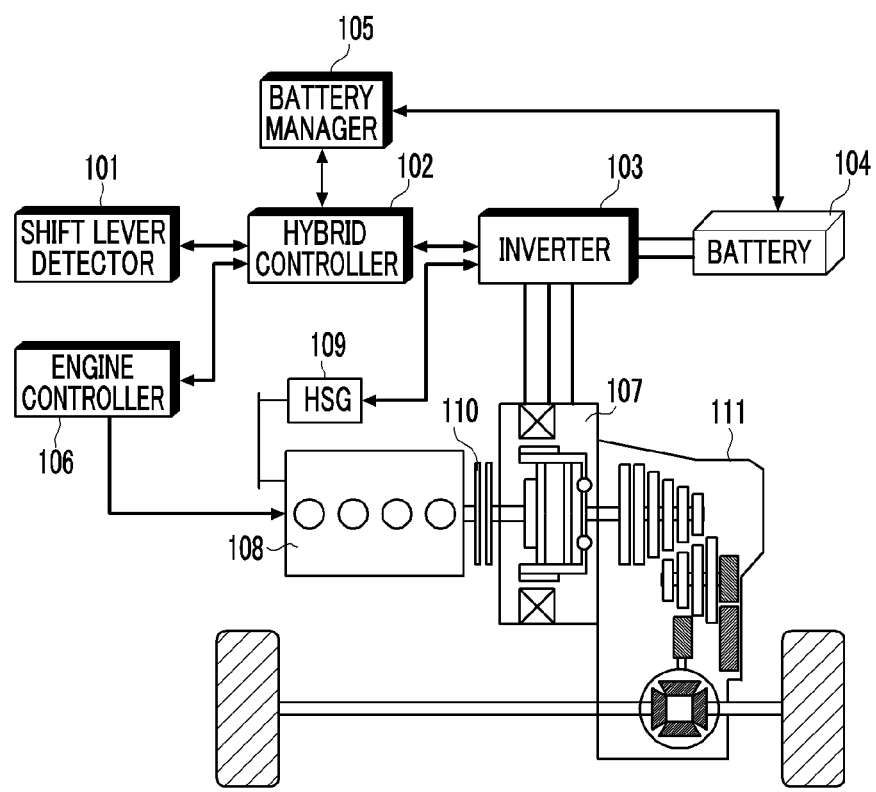
FIG. 1 is an exemplary diagram illustrating a detecting system for engine clutch delivery torque of an environmentally friendly vehicle according to an exemplary embodiment of the present invention.

| Description of symbols | |
|---|---|
| 101: Transmission detector | 102: Hybrid controller |
| 103: Inverter | 104: Battery |
| 105: Battery manager | 106: Engine controller |
| 107: Motor | 108: Engine |
| 109: HSG | 110: Engine clutch |

DESCRIPTION OF EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The parts unrelated to the description are not described to clearly describe the present invention and like reference numerals designate like elements throughout the specification. Further, the configurations shown in the drawings are provided selectively for the convenience of description and the present invention is not limited to those shown in the drawings.

FIG. 1 is an exemplary diagram illustrating a detecting system for engine clutch delivery torque of an environmentally friendly vehicle according to an exemplary embodiment of the present invention.

Referring to FIG. 1, an exemplary embodiment of the present invention may include a transmission sensor 101, a hybrid controller 102, an inverter 103, a battery 104, a battery manager 105, an engine controller 106, a motor 107, an engine 108, a HSG (Hybrid Starter and Generator) 109, an engine clutch 110, and a transmission 111.

The transmission sensor 101 may detect the position of a shift lever selected by a driver and may send an electric signal the position information to the hybrid controller 102. When the position of the shift lever is determined from the transmission sensor 101 to be at a P-position (park) or an N-position (neutral), the hybrid controller 102 may engage the engine clutch 110 with a control pressure above a contact point with a predetermined relative speed maintained between the motor 107 and the engine without load, may measure the delivery torque of the engine clutch 110 transmitted to the motor 107, and compare the deviation between the measured value and a basic model value, thereby detecting the delivery torque of the engine clutch 110. The hybrid controller 102 may calculate a compensation value according to the detected delivery torque of the engine clutch 110 and apply the compensation value to the control pressure.

The condition of the engine 108 without load means a condition when the engine is not in operation or is controlled in an idle mode, which means a status where a predetermined level of RPM may be maintained between the engine 108 and the motor 107 (e.g., there is a deviation in RPMs of the engine and the motor). The contact point when the engine clutch 110 is engaged means the control pressure for engaging the engine clutch 110 determined according to the detecting logic.

The hybrid controller 102 may calculate the compensation value by detecting the delivery torque of the engine clutch through the following detecting process.

When the transmission sensor 101 determines that the shift lever is at the P-range or the N-range, the hybrid controller 102 may enter a detecting mode and control the speed of the motor to a predetermined target speed through the inverter 103. Furthermore, the engine 108 may be stopped or controlled to idle and a predetermined level of RPM may be maintained between the engine 108 and the motor 107.

When the speed of the motor 107 converges to the predetermined target speed, the torque A of the motor 107 without load may be measured and stored, and the engine clutch 110 may be engaged by the pressure above the contact point (contact point pressure+'α') according to the detecting logic. The contact point means a clutch control pressure when the torque of the motor 107 starts changing with the plate of the engine clutch 110 in contact, and 'α' means an additional control pressure that allows the torque of the engine 108 to be transmitted to the motor and may be set in advance through an experiment.

Thereafter, torque B of the motor 107 including the delivery torque of the engine clutch 110 may be measured, when the speed and the torque of the motor 107 are stabilized, the torque of the motor 107 measured without load and the torque of the motor 107 including the delivery torque of the engine clutch 110 may be compared, thereby calculating a torque transmitted through the engine clutch 110. Further, a compensation factor may be calculated by comparing torque deviation with a model value of the set delivery torque of the engine clutch 110 and applied to the control pressure of the engine clutch 110.

The inverter 103 may control the motor 108 at a predetermined target speed in response to a control signal sent from the hybrid controller 102 in the detecting mode of the engine clutch 110. The inverter 103 may provide the information on the amount of consumed current generated in controlling the motor 108 at the target speed to the hybrid controller 102 to detect the torque of the motor 107 without load, and may provide the amount of consumed current of the motor with the engine clutch 110 engaged to the hybrid controller 102 to detect the torque of the motor 107 including the delivery torque of the engine clutch 110.

The battery 104 may include a plurality of unit cells and may store a high voltage for supplying driving voltage to the motor 107, for example, DC 350V to 450V. The battery manager 105 may manage the SOC (State Of Charge) by detecting the current, voltage, and temperature of the unit cells in the operation section of the battery 104 and may prevent the battery 104 from being over discharged to a limit voltage or overcharged to a limit voltage, by controlling the charging/discharging voltage of the battery 104.

The engine controller 106 may control the operation of the engine 108 in response to a control signal sent through a network from the hybrid controller 102. The motor 107 may generate torque by being operated by 3-phase AC voltage supplied from the inverter 103 and may supply regenerative energy by operating as a power generator. Start, stop, and output of the engine 108 may be controlled by the engine controller 106 and the amount of intake air may be controlled by an ETC (Electric Throttle Control), which is not shown.

The HSG 109 may operate as a starter and a generator, may start the engine 108 in response to a control signal supplied from the hybrid controller 102, may generate voltage by operating as a generator with the engine 108 operating, and may provide the generated voltage as charging voltage to the battery 104 through the inverter 103.

The engine clutch 110 may be disposed between the engine 108 and the motor 107 and connect or cut the power between the engine 108 and the motor 107 according to conversion of the EV mode and the HEV mode. The transmission 111 may be connected to the hybrid controller 102 through a network and shift to desired gears.

A detecting process of engine clutch deliver torque of an environmentally friendly vehicle according to the present invention which has the function described above is described below.

Figure 2:
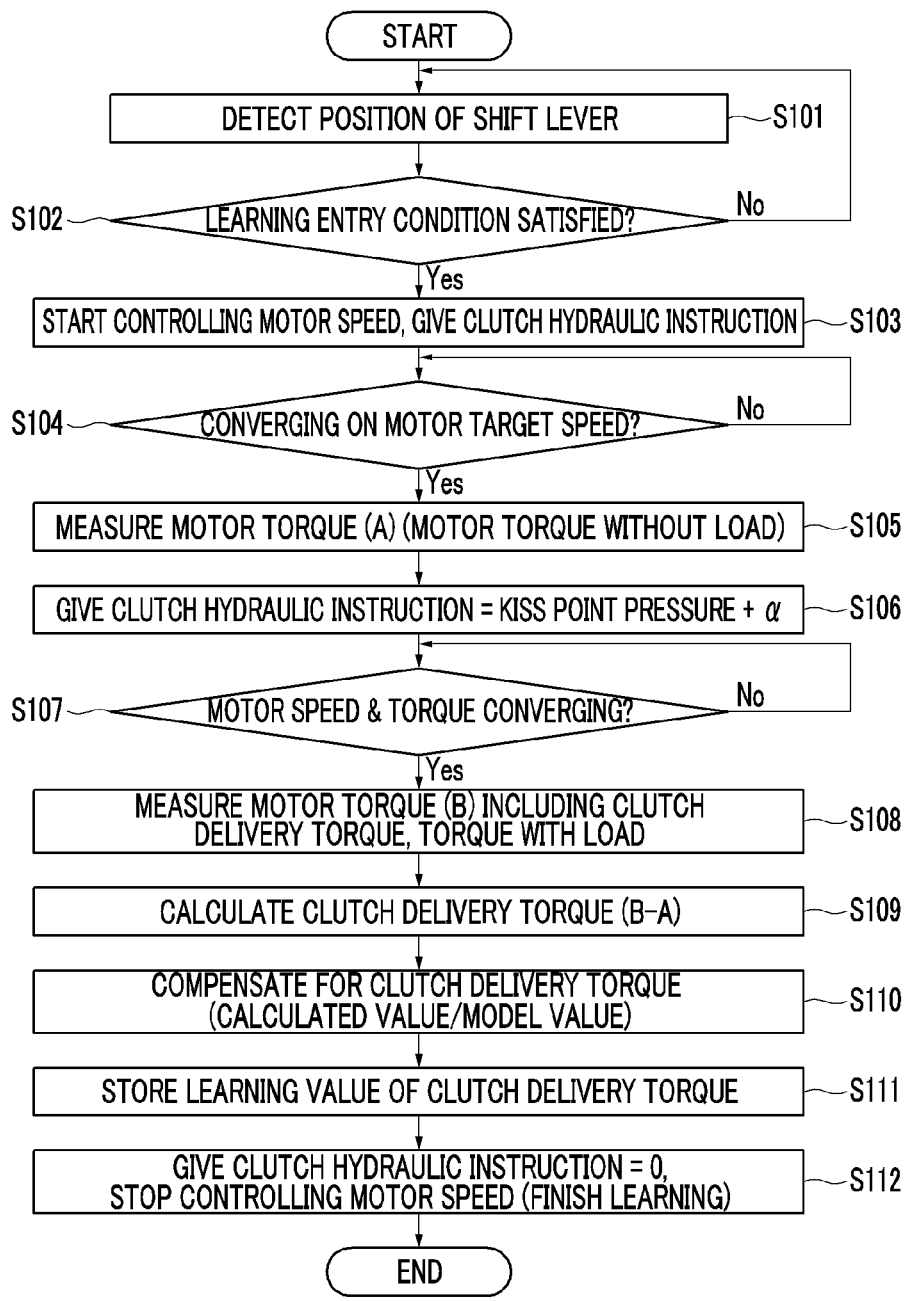
FIG. 2 is an exemplary flowchart illustrating a learning process for engine clutch delivery torque of an environmentally friendly vehicle according to an exemplary embodiment of the present invention.

FIG. 2 is an exemplary flowchart illustrating a detecting process for engine clutch delivery torque of an environmentally friendly vehicle according to an exemplary embodiment of the present invention.

In an environmentally friendly vehicle in which the present invention is applied, the hybrid controller 102 may detect the position of the shift lever provided from the transmission sensor 101 (S101) and may determine when a detecting entry condition for the delivery torque of the engine clutch 110 (S102). The delivery torque detecting condition of the engine clutch 110 means that the shift lever is at the P-range or the N-range.

When the detecting condition for the delivery torque of the engine clutch 110 is satisfied in S102, the hybrid controller 102 may enter the detecting mode and operate and control the motor 107 at a predetermined target speed through the inverter 103 (S103). Furthermore, the engine 108 may be stopped or controlled to an idle mode, wherein a predetermined level of RPM may be maintained between the engine 108 and the motor 107, and the hydraulic instruction of the engine clutch 110 may be output as zero '0'.

The hybrid controller 102 may detect the speed of the motor 107 and determine when the speed converges to the predetermined target speed (S104), and measure and store the torque ('A' in FIG. 3) of the motor 107 without load, when it converges to the target speed (S105).

Figure 3:
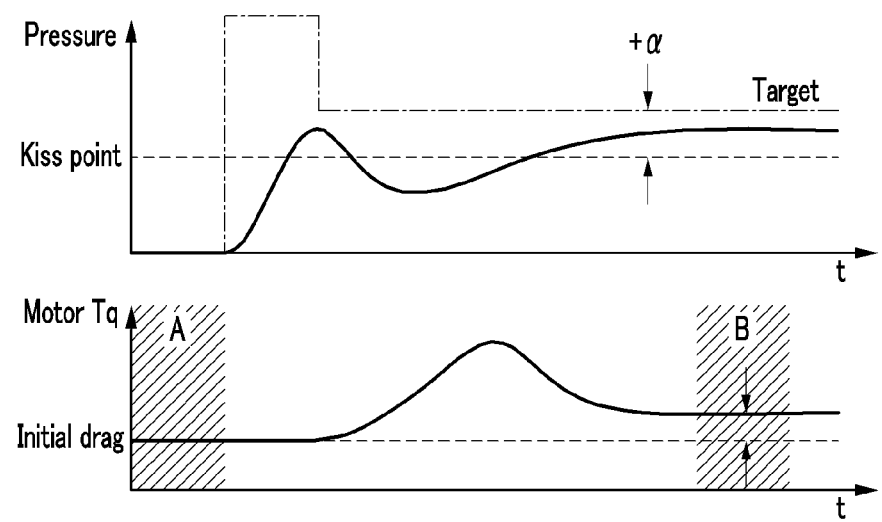
FIG. 3 is an exemplary diagram illustrating the concept of learning engine clutch delivery torque of an environmentally friendly vehicle according to an exemplary embodiment of the present invention.

Further, the hybrid controller 102, as shown in FIG. 3, may engage the engine clutch 110 with the control pressure above the contact point (contact point pressure+'α') according to the detecting logic (S106). When the speed and the torque of the motor 107 stably converge according to the engagement of the engine clutch 110 (S107), the hybrid controller 102 may measure the torque ('B' in FIG. 3) of the motor 107 including the delivery torque (load torque) of the engine clutch 110 (S108).

Thereafter, the hybrid controller 102 may calculate torque deviation transmitted through the engine clutch 110 by comparing the torque of the motor without load measured in S105 with the torque of the motor 107 with torque including the delivery torque of the engine clutch 110 (S109).

Further, the hybrid controller 102 may calculate a compensation factor by comparing a predetermined model value of the delivery torque of the engine clutch 110 with the torque deviation (S110). For example, the compensation factor may be obtained by dividing the torque deviation by predetermined delivery torque.

Thereafter, a detecting value may be stored to be applied to the control pressure of the engine clutch 110 and may be obtained by summing up the compensation factor and the model value of the delivery torque of the engine clutch 110. When detecting the delivery torque of the engine clutch 1110 is complete according to the procedure described above, the engine clutch 110 may be disengaged by outputting the hydraulic instruction of the engine clutch 110 as zero '0' and the operation of the motor 107 may be stopped (S112). The stored detecting value may be used to control the engagement of the engine clutch 110, and the further detecting may be replaced by a new detecting value.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A detecting system for engine clutch delivery torque of a vehicle equipped with an engine and a motor as power sources, the system comprising:
    an engine clutch configured to implement an EV (electric vehicle) mode and an HEV (hybrid electric vehicle) mode by engaging and disengaging the engine with the motor;
    an inverter configured to operate the motor by a hybrid controller;
    a transmission sensor configured to detect the status of a transmission; and
    wherein the hybrid controller is configured to:
        maintain a predetermined relative speed between the motor and the engine without load when the status of the transmission is a detecting condition for engine clutch delivery torque, by operating the motor at a target speed;
        engage the engine clutch with a control pressure above a contact point (contact point pressure+'α');
        measure torque of the motor including the delivery torque of the engine clutch; and
        compare the difference of the torque from a basic model value, to detect the delivery torque of the engine clutch.

2. The system of claim 1, wherein the engine without load is when a predetermined level of RPM is maintained between the motor and the engine when the engine is not in operation or is in an idle mode.

3. The system of claim 1, wherein the contact point when the engine clutch is engaged is when the torque of the motor starts changing with both ends of the engine clutch in contact.

4. The system of claim 1, wherein the detecting condition of the engine clutch is when the shift gear of the transmission is at a park position or a neutral position.

5. A detecting method of engine clutch delivery torque of a vehicle, the method comprising:
    determining, by a controller, when the position of a shift lever satisfies a detecting condition of engine clutch delivery torque;
    converging, by the controller, to a predetermined target speed by operating a motor without load, when the detecting condition of engine clutch delivery torque is satisfied;
    measuring, by the controller, motor torque without a load at the target speed;
    engaging, by the controller, the engine clutch with a control pressure above a contact point (contact point+α) according to a control logic;
    detecting, by the controller, motor torque including the delivery torque of the engine clutch, when the speed and the torque of the motor converge according to engagement of the engine clutch;
    calculating, by the controller, torque deviation by comparing the motor torque without load and the motor torque including the engine clutch delivery torque; and
    detecting, by the controller, a compensation factor by comparing a model value of the engine clutch delivery torque with the torque deviation.

6. The method of claim 5, wherein the detecting condition of the engine clutch delivery torque is set as an unloaded condition with a shift lever at a neutral position or a park position.

7. The method of claim 5, wherein an engine is maintained, by the controller, in non operation or is controlled in idle when detecting condition of the engine clutch delivery torque.

8. A non-transitory computer readable medium containing program instructions executed by a processor or controller, the computer readable medium comprising:
    program instructions that determine when the position of a shift lever satisfies a detecting condition of engine clutch delivery torque;
    program instructions that operate a motor without load to a predetermined target speed, when the detecting condition of engine clutch delivery torque is satisfied;
    program instructions that measure motor torque without a load at the target speed;
    program instructions that engage the engine clutch with a control pressure above a contact point (contact point+α) according to a control logic;
    program instructions that detect motor torque including the delivery torque of the engine clutch, when the speed and the torque of the motor converge according to engagement of the engine clutch;
    program instructions that calculate torque deviation by comparing the motor torque without load and the motor torque including the engine clutch delivery torque; and
    program instructions that detect a compensation factor by comparing a model value of the engine clutch delivery torque with the torque deviation.

9. The computer readable medium of claim 8, further comprising program instructions that detect the condition of the engine clutch delivery torque set as an unloaded condition with a shift lever at a neutral position or a park position.

10. The computer readable medium of claim 8, further comprising program instructions to maintain the engine in non operation or control the engine to idle to detect the condition of the engine clutch delivery torque.

* * * * *